United States Patent [19]

Wilkalis et al.

[11] 3,976,757

[45] Aug. 24, 1976

[54] METHOD FOR INCREASING THE PRODUCTIVITY OF CHEMICAL REACTORS

[75] Inventors: John E. Wilkalis, Morris Plains; Charles G. Barbaz, Caldwell, both of N.J.; Horace Q. Trout, Brooklyn, N.Y.

[73] Assignee: Allied Chemical Corporation, Morris Township, N.J.

[22] Filed: Aug. 12, 1964

[21] Appl. No.: 389,527

[52] U.S. Cl. ............................... 423/466; 423/352; 423/400; 423/468; 423/469; 423/472; 423/532
[51] Int. Cl.² ........................................... C01B 7/24
[58] Field of Search ............ 23/205, 163, 174, 198, 23/203, 206; 423/466, 469

[56] References Cited
UNITED STATES PATENTS

| | | | |
|---|---|---|---|
| 2,643,937 | 6/1953 | Pike | 423/405 |
| 3,341,295 | 9/1967 | Eibeck et al. | 423/468 |

FOREIGN PATENTS OR APPLICATIONS

| | | |
|---|---|---|
| 144,159 | 2/1959 | U.S.S.R. |

OTHER PUBLICATIONS

Schumb et al., Industr. Engng. Chem., vol. 42, (1950) pp. 1383 to 1386.

Smith, Science, vol. 141 (1963) pp. 1039 to 1040.

*Primary Examiner*—Leland A. Sebastian
*Attorney, Agent, or Firm*—Ernest A. Polin; Jay P. Friedenson

EXEMPLARY CLAIM

1. In the vapor phase reaction of $F_2$ with a member selected from the group consisting of $ClF_3$, $Cl_2$, $BrF_3$, $BR_2$ and $SF_4$, at elevated pressures and temperatures in a chemical reactor, carried out batch-wise so that reactant gases and product gases are permitted to mix; the improvement which comprises increasing the production capacity of the chemical reactor by raising the temperature of the reactor and contents non-uniformly with respect to position in the reactor so that the reactant and product gases are subjected to different temperature zones depending on their position in the reactor, the temperature of at least one of said zones being high enough to initiate and maintain the reaction therein, the temperature differential between at least two zones of different temperature being at least 3% of the maximum temperature attained in the reactor when measured on the Kelvin scale.

15 Claims, No Drawings

METHOD FOR INCREASING THE PRODUCTIVITY OF CHEMICAL REACTORS

Our invention relates to a method for increasing the productivity of chemical reactors. In a preferred embodiment, the invention is directed to an improvement in the process for preparing chlorine pentafluoride ($ClF_5$), by reacting chlorine trifluoride ($ClF_3$) with fluorine.

The preparation of many industrially important chemicals by reversible reactions, such as the production of oxides of nitrogen and sulfur, ammonia, chlorine pentafluoride and trifluoramine oxide, to name a few; is limited by reaction rates that are relatively low under conditions of favorable equilibrium.

A number of measures have been devised for the purpose of creating more favorable equilibrium conditions, in order to increase reaction rates and hence productivity for a particular reaction. In the case of the synthesis of ammonia from nitrogen and hydrogen, for example, the disadvantage of the relatively low equilibrium constant at normal pressures, for the temperatures at which the reaction takes place, may be overcome by the use of increased pressure to the ammonia-nitrogen-hydrogen equilibrium, resulting in increased productivity of ammonia. The presence of a catalyst in other cases, such as in the production of sulfur trioxide from sulfur dioxide and oxygen, permits the use of a lower, more advantageous temperature by shortening the time needed to establish equilbibrium thus resulting in shorter reaction times and increased productivity.

For every equibilbrium reaction in which the reverse reaction is favored by high temperatures, there is some intermediate temperature at which the forward production rate and equilibrium reconversion can be balanced to give an optimal design for the forward reaction in an isothermal reactor system. If temperature is controlled to vary with time, an optimal heat-up and cool-down cycle for this system exists. For such a cycle, heat is supplied or removed uniformly to or from the reactor contents, so that the temperature change of the reactor contents is progressively isothermal, or in other words, is substantially uniform throughout the reactor at a given time. This is conventionally accomplished by heating the reactor and contents uniformly, or by heating the reactor and stirring the contents thereof. The temperature differential or gradient thus imposed, is in respect of time only, and for purposes of this discussion will hereinafter be referred to as a time-temperature gradient. The optimal time-temperature relation for a slug of gas in a well designed sulfur dioxide converter, for example, calls for an increase in temperature in the early stage, to maximize the reaction rate, followed by a decrease in temperature in the final stage, to take advantage of more favorable equilibrium conversions at the lower temperatures.

When pressure has an influence on the ratio of the fugacity coefficients for the components of an equilibrium reaction, or when there is a change in the total number of moles of products as compared with the total number of moles of reactants; it can be expected that the production capacity of a reactor unit will vary with the pressure. The usual way of coping with the situation is to predetermine and fix the pressure of such a reaction at a practical and advantageous level and carry out the reaction according to the optimal time-temperature cycle, which can be determined by standard techniques.

We have found, unexpectedly, that the production capacities of such systems can be increases considerably and in some cases by as much as 100% over those capacities obtained by using the optimal time-temperature cycle, by heating the reactor and contents to reaction temperatures and above, non-uniformly, so that two or more zones of unequal temperatures are created througout the reactor. The temperature differential or gradient thus imposed is in respect of position in the reactor, as well as time and for purposes of this discussion will be hereinafter referred to as a time-position-temperature gradient. It has been found that the cooler portion or portions of the reactor prevent dissociation of the product and excessive pressure build-up, while permitting a higher reaction rate in the warmer portion or portions of the reactor than would otherwise be obtainable. Moreover, the increased density of the gaseous components within the cooler portion or zones of the reactor permits larger charges of reactants to be made and stored within the reactor, without the accompanying disadvantage of over-pressurization. The overall result is an increase in productivity of the reactor, or in other words, more pounds per hour of sought-for product.

It is accordingly a major object of the invention to provide a means for increasing productivity of chemical reactors in equilibrium reactions wherein the forward reaction is favored by conditions of high pressure.

It is a further object of the invention to provide a means for increasing the productivity of a chemical reactor in equilibrium reactions wherein the total number of moles of product components is less than the total number of moles of reactant components.

It is another object of the invention to provide a means for increasing the productivity of a high pressure chemical reactor in equilibrium reactions wherein the compressibility of the products is greater than the compressibility of the reactants.

It is still another object of the invention to provide a means for increasing the productivity of a chemical reactor used for preparing chlorine pentafluoride ($ClF_5$).

Other objects and advantages of the invention will become apparent from the following description and examples, when taken in conjunction with the claims.

Generally, in practice of the invention, the above objects may be achieved, in a batch reactor, by quickly heating one or more portions of the reactor, which has previously been cooled to a low temperature. This expedient will serve to set up a time-position-temperature gradient, as discussed supra. Another way of accomplishing the same purpose is by heating one or more portions of the reactor, while cooling one or more other portions of the reactor. The partial cooling may readily be effectuated by insertion of one or more "cold fingers" into the reaction mixture which is being heated in other areas. Other means for achieving the same end will readily occur to those skilled in the art. It is apparent that by heating even a small portion of the reactor and contents at room temperature; that at least a small time-position-temperature gradient will be introduced into the system. Even a small gradient will have a beneficial effect upon the productivity of the reactor, however, greater than insubstantial gradients are required to effect significant increases in productivity.

The effect of the unequal heating procedure is to cause zones of different temperatures to exist in the reaction mixture. This in turn sets up circulating convection currents of reactants in the reactor, during which time the reaction components are continuously heated and cooled. Although the temperature in the resulting higher temperature zone or zones becomes high enough to initiate and maintain the reaction; the average temperature of the reactor contents, throughout the reactor, remains relatively low. It appears that by lowering the average temperature, more favorable equilibrium conditions are created. It was quite surprising to find that initial high temperatures in one or more zones and lower temperatures in one or more other zones permit higher reaction rates and larger charges to be made to the same volume of reactor, without consequent over-pressurization of the system and dissociation of the products, as compared with the reaction rates and maximum charges feasible with the same reactor under isothermal conditions.

The words "hot" and "cold," or "high" and "low," when used in connection with the terms "zones" or "temperature," respectively, are meant to be understood as applying in a relative sense with respect to the initial temperature differential established. As the reaction proceeds, the temperature differential approaches zero and the words assume a proportionately greater relative meaning.

Application of the time-position-temperature gradient to chemical reactors, in order to increase productivity, according to the invention, may be made to all vapor-phase equilibrium reactions, organic or inorganic, wherein the total number of moles of components produced is less than the total number of moles of components reacted and also to those equilibrium reactions wherein the compressibility of the products is greater than the compressibility of the reactants. Typical examples of equilibrium reactions susceptible to the procedure of the invention include the following:

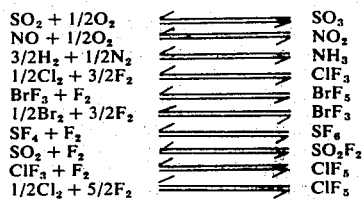

Organic reactions susceptible to the invention procedure include such reactions as $Cl_2$ and HF addition to the double unsaturated bonds of olefinic compounds. It is to be understood that this listing is for illustrative purposes only and is not intended to limit or otherwise restrict the invention except as defined by the scope of the appended claims.

More particularly, in practicing the invention, the reactant materials are charged to a high pressure reactor in such amounts as to permit the maximum feasible pressure during the reaction to be fixed at a predetermined value, without running the risk of over-pressurizing the system. Considerations as to fixing this maximum value, as well as to further controlling the pressure within the reactor, will be discussed in more detail hereinafter. Instead of following the empirically determined optimal time-temperature cycle, the reactor is initially divided into distinct temperature zones, some of which are heated to relatively high temperatures, the others being kept or cooled to relatively low temperatures. Any number of hot and cold zones may be employed. In general, the greater the number of such zones, of different temperature; the better the results. Excellent results are obtained, however, and most conveniently, when the reactor is divided into two temperature zones, one hot and one cold. This may be accomplished in any suitable manner, as discussed hereinbefore, such as by rapidly heating only a portion of the reactor, which reactor has, in totality been previously cooled to a low temperature by means of a liquid nitrogen bath, for example. In this manner, a time-position-temperature gradient is introduced into the reactor contents. Generally speaking, the higher the temperature gradient, that is, the greater the temperature differential between the two zones, the better will be the results. As the reaction proceeds, the gradient is reduced and approximates zero at the end of the reaction.

Apparatus employed may include any suitable high pressure batch reactor, such as the bomb type, for example, which may be made of conventional materials, including steel or nickel, Monel or other such non-corrosive materials in the event that the reactants and products are corrosive in nature. Means need be provided for heating the heater quickly to a high temperature along a portion of its surface, including means for removing this source of heat at will. An electric furnace, so arranged that it can be moved to exchange heat with a larger or smaller portion of the reactor, as desired, is particularly effective for this purpose. The heating coils of the furnace may be concentrated at one end of the furnace to assist in rapid heating of a portion only of the reactor and thus facilitate setting up of the temperature gradient. If desired, cold fingers may be movably positioned so as to establish or assist in maintaining a cold zone in the reactor. The reactor should also be equipped with a pressure gauge and valved openings to facilitate selective charging of reactant materials and evacuation of products and unreacted starting materials. The optimal time-temperature relation is the same for plug flow reactors as it is for batch reactors. A similar time-temperature relation exists for backmixed reactors. Thus, isothermal reactions in these types of reactors are common, the optimal heat-up, cool-down cycles corresponding to a temperature gradient with respect to time only. The technique of the invention, for increasing productivity, may be applied to continuous type reactor operations, such as the plug flow and backmixed reactors, by providing obvious modifications necessary to provide a temperature gradient in respect of position as well as in respect of time. Such modifications will readily occur to those persons skilled in the art. By way of example, a time-position-temperature gradient can be achieved in a continuous flow reactor, such as a plug flow reactor, by providing concentric reaction tubes; the flow of reactants taking place through one of the tubes, each tube being provided with zones of different temperatures along its length, and no two opposing zones of the tubes coinciding in temperature at any particular location. Temperature differential between hot and cold zones in such reaction tubes may be as high as can practically be designed and varies with position as well as with time. It is apparent that the method of the invention may be applied to a wide variety of chemical reactors, batch or continuous, with suitable provisions for introducing a time-position gradient, as opposed to merely a time-temperature gradient, as hereinbefore defined.

As a general rule, in those reactions to which the invention process is applicable, the higher the pressure, the more favorable will be the equilibrium shift to the right and the higher will be the reaction rate and productivity therefor. It is, accordingly, generally desirable to operate at the maximum possible pressure. The maximum possible pressure is theroretically dependent upon such factors as: the nature of the particular reaction, the starting materials involved and the stability of the products. From a practical standpoint, the maximum possible pressure, so determined, is considerably higher than the physical strength of known reactors. The maximum feasible pressure therefor, is determined by the maximum pressure capacity of the particular reactor employed, less a suitable safety factor. The maximum feasible pressure for a given reaction is predetermined and the pressure during the reaction is not allowed to exceed this value. This is controlled initially by regulating the size of the reactant charges, so that the pressure developed by the rise in temperature in the reactor will not exceed the predetermined value. Since the process of the invention permits larger charges than would have been expected, without over-pressurization, calculation of the maximum pressure to be developed in the system is somewhat speculative. The values may be determined by test runs taking the precaution of providing a safety valve, if needed, to release the pressure in the system. Slight over-pressurization, if threatened, may be controlled by removing or diminishing the heat source as the pressure in the system approaches the predetermined value.

Time of reaction will, of course, vary according to the particular process involved. In a batch process, the optimum time during which the reaction is allowed to proceed may be readily determined by the following procedure: As the reactor heats up, the reaction rate increases as does the pressure. Eventually, although heat is still being added to the reaction mixture and the temperature of the same is increasing; the pressure will drop indicating a decrease in total moles, or in other words, indicating that sought-for product is being formed. The pressure drop due to formation of product is not to be confused with a slight decrease or leveling off of pressure, which may be observed at low pessures, as the reaction mixture passes through its critical temperature. As the reaction proceeds, progressively less product is formed and the rate of pressure drop decreases correspondingly. The rate of pressure drop is also affected by the continued rise in temperature which tends to increase the pressure in the reactor. When the reaction has proceeded to the point where the rate of pressure drop is so low as to be offset by the increase in temperature, the pressure in the system will again being to rise. This signifies substantial completion of the reaction and at this point the heat source may be removed. The reactor may then be allowed to cool to a point wherein the reaction rate is negligible, following which the unreacted materials and desired product are recovered by conventional means, such as distillation.

Temperatures employed in the hot (or reactive) zones are at least as high as those which would normally be used for reacting the particular materials involved. Due to the nature of our technique, it is possible to employ even higher temperatures in these zones and thus enjoy higher reaction rates, due to the fact that over-pressurization is prevented or minimized in the cold zones of the reactor. The higher temperatures employable, according to the process of the invention, would result in over-pressurization of the reactor in an isothermal system.

As discussed heretofore, it is desirable to introduce a high time-position-temperature gradient into the reactor. In other words, the temperature differential, initially, between hot and cold zones should be as high as possible. The productivity of the reactor will be increased even when very small time-position-temperature gradients are introduced; however, to achieve better than insignificant results, it is desirable to so control the hot and cold zones, so that a temperature gradient is introduced, which is in the magnitude of at least 3% of the maximum temperature attained in the reactor, when measured on the Kelvin scale. Commensurately better results will be obtained by using progressively higher temperature gradients. Temperature gradients in the order of at least about 10% of the maximum temperature in the reactor, when measured on the Kelvin scale, result in substantial increases in productivity over a corresponding isothermal system.

Experience has shown that even superior results, as compared with a two zone system, are obtained by using a plurality of hot and cold zones and generally, the more the better. This is, of course, difficult to effectuate from a practical standpoint. For most purposes, however, effectuation of a two zone system, i.e., one hot zone and one cold zone, is quite satisfactory. Experience has shown that best results are otained when a relatively small hot zone is coupled to a larger cool zone, say for example, a volume ratio of hot to cold in the order of about 1:12 to about 1:3. Optimum sizes of the zones may be determined in the individual case by test runs.

The following examples, 1–2 and 6–8, illustrate practice of a preferred embodiment of the invention, viz, using the improvement of the invention on the manufacture of $ClF_5$ form $ClF_3$ and $F_2$, which is a known procedure. For comparative purposes, Examples 3–5 illustrate the conventional isothermal production of $ClF_5$, i.e., employing the optimal time-temperature cycle.

EXAMPLE 1

218.8 g. of chlorine trifuoride and 98.4 g. of fluorine were charged to a 300 cc. capacity, high pressure reactor, which reactor was 12 inches long, 2½ inches in diameter and was equipped with a pressure gauge and high pressure valve. The reactor and contents were cooled, by means of a liquid nitrogen bath, to a temperature approximating the temperature of liquid nitrogen (about −196°C.). A cylindrical electric furnace, 13 inches long, 11 inches O.D., 3 inches I.D., rated at about 900 watts and pre-heated red-hot, i.e., to about 600°C., was raised around the cold reactor so that about 8 inches of the reactor would be heated directly. The furnace windings were mainly concentrated in the lower 7 inches of the furnace. In this manner, the hottest portion of the furnace affected about the bottom 1/6 of the reactor. The average temperature and pressure in the reactor increased. The pressure was not permitted to exceed about 8400 psi. and was controlled and kept below this value by lowering the furnace when the pressure rose to about 8300 psi., thus subjecting a smaller portion of the reactor to the furnace heat. The temperature in the lower portion of the reactor was extimated to reach 230°–280°C. on the wall of the reactor; whereas the temperature in the upper portion varied from approximately 175°C., immediately adjacent the lower portion, to about 125°C. in the uppermost portion of the reactor. The reaction was allowed to proceed until the rate of pressure drop, due to reaction, was less than the effect of the rise in temperature on pressure. At this point the furnace was lowered and the reactor was allowed to cool to a point at which the reaction rate was substantially negligible (approximately 140°C.). The unreacted fluorine was vented off and the product, chlorine pentafluoride, was recovered by distillation from the unreacted chlorine trifluoride. 196.3 g. of chlorine pentafluoride product was produced in a total reaction time of 85 minutes.

EXAMPLE 2

229.0 g. of chlorine trifluoride and 103.3 g. of fluorine were charged to a 300 cc. capacity, high pressure reactor, which reactor was 12 inches long, 2½ inches in diameter, and equipped with a pressure gauge and high pressure valve. The reactor and contents were cooled, by means of a liquid nitrogen bath, to a temperature approximating the temperature of liquid nitrogen (about −196°C.). A cylindrical electric furnace, 13 inches long, 11 inches O.D., 3 inches I.D., rated at about 900 watts and pre-heated red-hot, i.e., to about 600°C., was raised around the cold reactor so that about 7 inches of the reactor was heated directly. The furnace windings were mainly concentrated in about the lower 7 inches of the furnace. In this manner, the hottest portion of the furnace affected about the bottom 1/12 of the reactor. The average temperature and pressure in the reactor increased. The pressure was not permitted to exceed about 8400 psi. and was controlled and kept below this value by lowering the furnace when the pressure rose to about 8300 psi., thus subjecting a smaller portion of the reactor to the furnace heat. The temperature in the lower portion of the reactor was estimated to reach 230°–280°C. on the wall of the reactor, whereas the temperature in the upper portion varied from approximately 150°C., immediately adjacent the lower portion, to about 100°C. in the uppermost portion of the reactor. The reaction was allowed to proceed until the rate of pressure drop, due to reaction, was less than the effect of the rise in temperature on pressure. At this point the furnace was lowered and the reactor was allowed to cool to a point at which the reaction rate was substantially negligible (approximately 140°C.). The unreacted fluorine was vented off and the product, chlorine pentafluoride, was recovered by distillation from the unreacted chlorine trifluoride. 210 g. of chlorine pentafluoride product was produced in a total reaction time of 55 minutes.

ples 3–5 were run at maximum productivity, but isothermally, in the same pressure reactor, using the conventional optimal time-temperature relation. Reaction temperatures were in the neighborhood of 150°–160°C. In all the Examples, the amount of fluorine charged was approximately 10% in excess of the stoichiometric. The pressure in Examples 3–8 was kept below about 8400 psi. It can readily be seen from a comparison of isothermal Examples 3–5 and time-position-temperature gradient Examples 6–8 according to the procedure of the invention, that in the latter examples, larger charges of reactants were possible without danger of over-pressurizing the reactor beyond 8400 psi.; significantly higher reaction rates were achieved resulting in consequent, markedly shorter total reaction times and greater overall productivity of the reactor was realized.

Although our invention has been specifically illustrated by the production of $ClF_5$ from $ClF_3$ and $F_2$, in a batch type reactor; it is to be understood that this embodiment is for illustrative purposes only, the generally outlined procedure being applicable to a variety of other reactions as described hereinbefore and with continuous type reactors, as well as batch type reactors. Accordingly, the invention is to be limited in scope only by a reasonable interpretation of the following claims.

We claim:

1. The vapor phase reaction of $F_2$ with a member selected from the group consisting of $ClF_3$, $Cl_2$, $BrF_3$, $Br_2$ and $SF_4$, at elevated pressures and temperatures in a chemical reactor, carried out batch-wise so that reactant gases and product gases are permitted to mix; the improvement which comprises increasing the production capacity of the chemical reactor by raising the temperature of the reactor and contents non-uniformly with respect to position in the reactor so that the reactant and product gases are subjected to different temperature zones depending on their position in the reactor, the temperature of at least one of said zones being high enough to initiate and maintain the reaction therein, the temperature differential between at least two zones of different temperature being at least 3% of the maximum temperature attained in the reactor when measured on the Kelvin scale.

2. The process of claim 1 wherein the temperature differential between at least two of the zones of different temperature is at least 10% of the maximum temperatures attained in the reactor when measured on the Kelvin scale.

3. The process of claim 2 in which the reactor and contents are pre-cooled prior to non-uniformly raising the temperature of the same.

4. The process of claim 2 in which one or more por-

| EXAMPLE NO. | CHARGE $ClF_3$ (g.) | PRODUCT $ClF_5$ (g.) | REACTION RATE (g./hr.) | TOTAL REACTION TIME (min.) |
|---|---|---|---|---|
| 3 | 150 | 142 | 43.7 | 195 |
| 4 | 150 | 156.6 | 41.7 | 225 |
| 5 | 150 | 157.7 | 48.5 | 195 |
| 6 | 210 | 192 | 203.0 | 57 |
| 7 | 210 | 189 | 218.0 | 52 |
| 8 | 210 | 192 | 213.8 | 54 |

Above Examples 6–8 were run in an apparatus and by a procedure identical to that employed in Examples 1 and 2, with minor variations in size of hot and cold zones and magnitude of temperature gradients. Examtions of the reactor and contents are cooled during the reaction.

5. The process of claim 2 in which, during the reaction, there is effected simultaneous cooling and heating of different portions of the reactor and contents.

6. In the vapor phase reaction of $F_2$ with $ClF_3$, at elevated pressures and temperatures in a chemical reactor, carried out batch-wise so that reactant gases and product gases are permitted to mix; the improvement which comprises increasing the production capacity of the chemical reactor by raising the temperature of the reactor and contents non-uniformly with respect to position in the reactor so that the reactant and product gases are subjected to different temperature zones depending on their position in the reactor, the temperature of at least one of said zones being high enough to initiate and maintain the reaction therein, the temperature differential between at least two zones of different temperature being at least 3% of the maximum temperature attained in the reactor when measured on the Kelvin scale.

7. The process of claim 6 in which the temperature differential between at least two of the zones of different temperature is at least 10% of the maximum temperature attained in the reactor when measured on the Kelvin scale.

8. The process of claim 7 in which the reactor and contents are pre-cooled prior to non-uniformly raising the temperature of the same.

9. The process of claim 7 in which one or more portions of the reactor and contents are cooled during the reaction.

10. The process of claim 7 in which, during the reaction, there is effected simultaneous cooling and heating of different portions of the reactor and contents.

11. The process of claim 7 in which one hot zone and one cold zone are created in the reaction mixture.

12. The process of claim 7 in which a multiplicity of hot zones and a multiplicity of cold zones are created in the reaction mixture.

13. The process of claim 7 in which the temperature differential between at least two of the zones is at least about 125°C., the total volume of the warmer zones being in the range of about 1/12 to about 1/5 of the total volume of the cold zones.

14. The process of claim 13 in which the reactor and contents are pre-cooled prior to non-uniformly raising the temperature of the same.

15. The process of claim 13 in which one or more portions of the reactor and contents are cooled during the reaction.

* * * * *